July 18, 1967  W. G. FETZER  3,331,311

METHOD FOR DETERMINING SOUND FOCUS FOR MINING BLAST

Filed Feb. 3, 1966

INVENTOR
WALLACE G. FETZER
BY
*Hoffmann and Yount*
ATTORNEYS 3,331,311
METHOD FOR DETERMINING SOUND FOCUS
FOR MINING BLAST
Wallace G. Fetzer, Parkview, Ohio, assignor to Oglebay Norton Company, Cleveland, Ohio, a corporation of Delaware
Filed Feb. 3, 1966, Ser. No. 524,799
3 Claims. (Cl. 102—23)

The present invention relates to a method for avoiding the damages due to atmospheric focusing of the air blast effects of a major explosion.

One of the main concerns in the setting off of a major explosion, such as are used in open pit mining, is to determine whether or not the atmospheric conditions are such that the air blast effects will be focused in a populated area or another area subject to damage by the air blast effects of the explosion. Such focusing effects may occur as far as ten miles from explosions of magnitudes commonly used in mining. It can be readily appreciated that when such large blasts are being made close to populated areas, it is important to determine whether or not there will be detrimental focusing of the air blast effects in the populated area.

Focusing of air blast effects may occur because of temperature or wind conditions. In motionless air with zero temperature gradient, the atmospheric effects of blasting are propagated radially with spherically uniform intensity. When the temperature increases with altitude or if the wind velocity is high or increases with altitude, a part of the air blast energy is refracted back to the earth's surface in form that can be greatly intensified due to a focusing effect due to these conditions.

An effective but elaborate system for detecting focusing conditions in the atmosphere has been recently developed. The system employs weather balloons and radiosonde for determining temperatures and wind gradients. Wind velocities are calculated from successive positions of the balloon. Air temperatures are telemetered back by radiosone. Sufficient data for forecasting air blast effects by this system involves determinations of temperature, wind velocity and direction at intervals of 500 feet to an altitude of 5,000 feet and at intervals of not more than 1,000 feet from altitude between 5,000 and 12,00 feet. In using this system, it is desirable to have an analog computor at hand to be able to cope with all cases which arise. Such a system is indirect, laborious, and relatively expensive.

An important object of the present invention is to provide a new and improved method of blasting with large charges which will include a pre-check in a simple and direct manner involving the use of a pilot blast to determine whether the main blast will be adversely focused.

Figure 1:
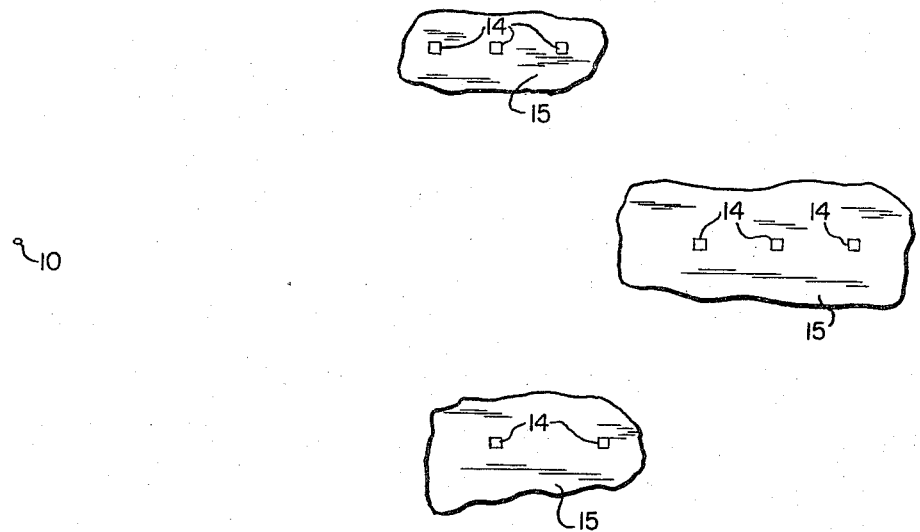
Figure 2:
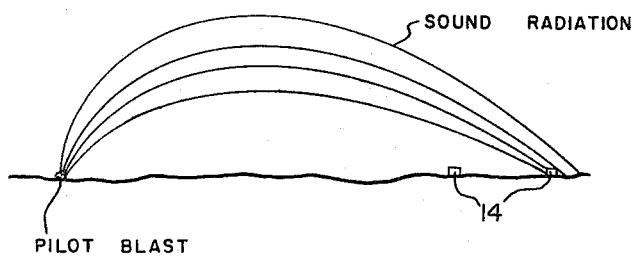

Further objects and advantages of the present invention will be apparent to those skilled in the art from the following detailed description thereof made with reference to the accompanying drawings in which FIG. 1 is a schematic view of a blast area; and
FIG. 2 illustrates a focusing effect.

I have discovered that the detrimental effects of air blasts may be accurately forecast prior to the large explosion in a much simpler and more direct method than that heretofore believed necessary. I have discovered that the effects of a small pilot explosion at the site of the main explosion can be measured to determine the effects of a much larger explosion and that it is possible by measuring the effect of the explosion of a pilot charge to accurately forecast whether or not there will be a detrimental focusing effect in any selected area from the explosion of the main blast, provided the main explosion is set off immediately following the pilot explosion. This correlation persists even though the sound waves resulting from the blasts are not the same.

In the preferred practice of the present invention, a pilot explosion is set off at the surface of site 10 of the proposed blast and commercial sound level meters 14 are used to measure the level of sound at each location 15 where there is concern about the air blast effects of an explosion. Preferably the peak pressure, over pressure, of the sound is measured. Normally the area of focusing of an air blast will have a width of at least about one thousand feet proceeding in a direction away from the blast. If the focusing is due to thermal gradients, the area will be an annular ring and if due to wind effects, it will be an area located to the leeward side of the explosion. A combination of wind and thermal gradients will produce a combination of the two effects. Accordingly, if instruments 14 are set in the area to be checked at intervals of one thousand feet proceeding in a given direction away from the blast any sound focus in that area can easily be determined. As illustrated in FIG. 1 instruments can be utilized as it required to cover the areas where there is concern for the effects of the blast.

After the instruments have been located, a pilot charge, preferably a known charge, not large enough to be capable of having an adverse effect but sufficiently large to provide a response on the meters is exploded at the blast site 10. As illustrated in FIG. 2, a sound focus may exist and if so the reading on the sound level meter will be at a value which indicates such a focus. I have that a charge equivalent to 20 pounds of TNT exploded at ground level as a pilot blast will provide satisfactory response in instruments up to a distance of approximately five miles. For larger distances the weight of the pilot charge should be increased as a cubic function of the distance. If a reading is recorded which indicates a sound focus for the pilot blast, then a focus will also occur for a large blast and if the response on the meter indicates no adverse focusing of the pilot blast, then there will be no adverse focusing of the pilot blast and it is safe to explode the main blasting charge without concern for a focusing effect if the main explosion follows the pilot explosion without a delay in time such as to allow the atmospheric conditions to change. Preferably the main blast is set off as soon as the readings for the pilot blast are made. If desired, a series of tests may be run to establish a minimum reading at each location for the pilot blast of a known charge and to establish the readings on the meter which clearly signify an adverse effect due to focusing. Also, instruments located in widely scattered locations may be used as controls for each other since air blast effects, in the absence of focusing, normally vary as a known function of distance.

If no focus is indicated by the pilot blast, the main explosion should be set off immediately. Various ways may be used to indicate whether or not it is safe to trigger the main explosion. Meters may be read remotely at a central location or may be manned at each location with information being fed back by telephone.

In so far as I am aware, no one has previously appreciated that the effects of a blast which might have a detrimental focusing effect can be forecast by setting off a pilot explosion of much lower intensity and of a magnitude not capable of causing damage because of the focusing of sound waves but yet of a magnitude such as to give a minimum response on instruments located at an appropriate distance and that the focusing conditions for this blast will be the same as for a larger blast if no change occurs in atmospheric conditions.

It can be seen that the foregoing method is a substantial improvement over the earlier described method and over other methods presently in use to forecast the effect of a blast.

In summary, in practicing the method of my invention, a small pilot explosion of sufficient magnitude to be used for measuring at locations where there is concern about undesirable effects is exploded and the effect of the blast is measured to determine whether or not there is a sound focus which will cause a detrimental impact. Instruments may automatically trigger any signal in any conventional way in the event that a detrimental reading is reached. In the absence of a detrimental response in the instruments, the main blast is immediately exploded with assurance that there will not be a detrimental focusing of the sound.

Various modifications of the described method will be apparent to those skiled in the art and it is hereby my intention to cover all such modifications and variations which fall within the ability of those skilled in the art and within the scope and spirit of the invention.

What is claimed is:

1. The method of blasting comprising the step of determining whether a relatively large charge of explosive can be exploded without adverse effects in any given area due to focusing by the atmospheric conditions which comprises exploding immediately prior to the setting off of the large charge a pilot charge of insufficient size to cause damage even though focused, measuring the intensity of sound waves in each of said areas from the pilot explosion to determine whether a focusing by the atmosphere exists, and immediately exploding the main explosive charge in the absence of a focusing condition.

2. The method as defined in claim 1 wherein the pilot charge is equivalent to 20 pounds of dynamite.

3. The method as defined in claim 1 wherein the pilot charge will provide a measurable response in all areas likely to be damaged by a focusing condition.

No references cited.

SAMUEL FEINBERG, *Primary Examiner.*

G. H. GLANZMAN, *Assistant Examiner.*